Feb. 19, 1924.
V. H. PETERSON
1,483,950
ROTARY CUTTING TOOL
Original Filed Nov. 25, 1921
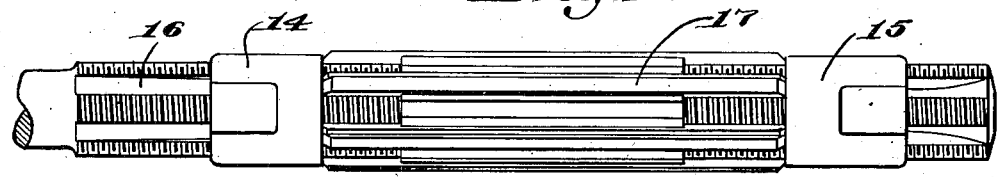
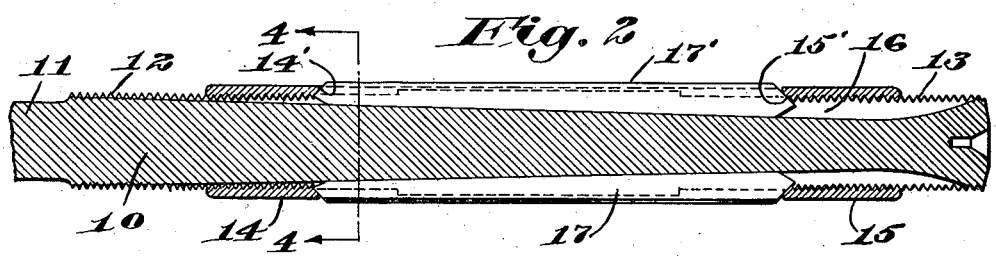
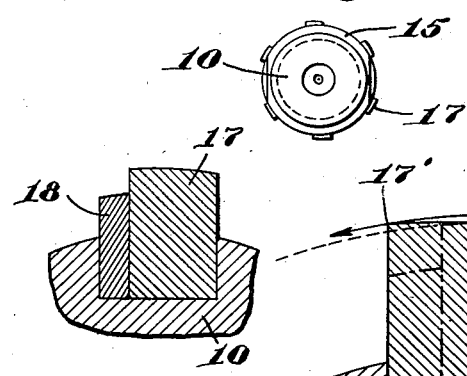
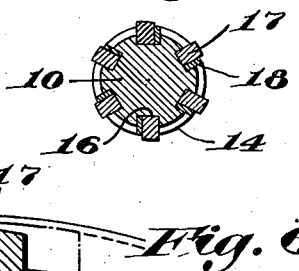
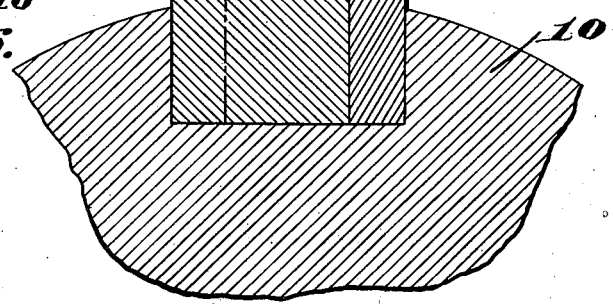
Inventor
Victor H. Peterson
by Mitchell, Chadwick & Kent
Attorneys Patented Feb. 19, 1924.

1,483,950

UNITED STATES PATENT OFFICE.

VICTOR H. PETERSON, OF BELMONT, MASSACHUSETTS, ASSIGNOR TO MOBACK TOOL & MACHINE MANUFACTURING CORPORATION, OF BOSTON, MASSACHUSETTS, A CORPORATION OF MASSACHUSETTS.

ROTARY CUTTING TOOL.

Application filed November 25, 1921, Serial No. 517,579. Renewed December 14, 1923.

*To all whom it may concern:*

Be it known that I, VICTOR H. PETERSON, a subject of the King of Sweden, residing at 74 Fleet Road, Belmont, Massachusetts, in the county of Middlesex and State of Massachusetts, have invented certain new and useful Improvements in Rotary Cutting Tools, of which the following is a specification.

This invention relates to improvements in rotary cutting tools. It is herein illustrated as it may be applied in an adjustable reamer, but it may be used in other tools to which the idea is applicable.

In such tools, the cutting edge of the blade must project a little further from the axis than does the metal just back of the edge, in order to make the tool operative and give clearance. In consequence, it is not possible to grind such a tool in order to sharpen it while the tool is rotating; but the blades have to be ground individually. It is an object of the invention to permit of the grinding of all of the blades simultaneously and uniformly. In cases where blades are taken out of the setting in order to grind them, there is always the danger, and even the probability, of their not being ground precisely alike, so that when restored to their setting some may project further than others. It is another object of the present invention to provide so that all of the blades may be ground in their setting. Thus it is made certain that they will be made true and equal when used in rotation about the same axis on which they were ground. Other objects of the invention are to provide for the proper grinding at a lower expense for labor than hitherto, and in shorter machine time. It is also an object of the invention to provide the other advantages that are characteristic of the construction and method of operation hereinafter described. Among these are the smoother and better quality of work which results from the convex relief or clearance surface provided by the invention, and the ability to keep tools sharp without the expense, which is prohibitive for many individuals and small shops of purchasing a special machine for grinding, as hitherto required.

These objects are accomplished by providing a shim or spacer for each blade in the tool, it and the blade filling the groove which is provided for holding the blade. This shim may be set on either side of the blade in the groove in order to set the blade in one position in the groove for being sharpened and in another position in the groove for cutting. In the form illustrated the bottom of the groove has a plane surface perpendicular to the radius of the tool. The shim is set in advance of the blade when the blade is to be ground. All of the blades being thus set, and the reamer being then rotated on its axis, as in a lathe, the outer or peripheral face of each blade becomes a section of a surface of revolution whose axis is the axis of the reamer. The grinding having proceeded until the cutting edges of the blades are sharp, the shims are shifted to the rear sides of the blades. This sets the blade forward a distance equal to the thickness of the shim; executes this movement in a direction which is perpendicular to the radius; and therefore sets the leading edge of the blade into a position where it is projecting outside of the surface of revolution in which it travelled while being ground. In this position the peripheral face of each blade intersects the surface of revolution generated when the blade was ground, with the leading edge in a surface of revolution having greater radius about the axis of the tool, and being at a greater distance from the axis than is any other part of the peripheral face. This is the working or cutting setting. Whenever the cutting edges are dulled so that it is desired to sharpen them, it is necessary only to transpose each, the blade and its shim, so that the peripheral faces of all of the blades again constitute sections of a surface of revolution about the tool's axis, whereupon all of the peripheral faces, and consequently all of the cutting edges, may be ground simultaneously by rotation of the tool against an abrasive.

It is intended that the patent shall cover, by suitable expression in the appended claims, whatever features of patentable novelty exist in the invention disclosed.

In the accompanying drawings:

Figure 1 is a side view of a tool embodying the invention;

Figure 2 is the same in medial section;

Figure 3 is an end view;

Figure 4 is the same in section on the line 4—4 of Figure 2;

Figure 5 is an end view in section, showing a detail enlarged with the parts in position for grinding; and Figure 6 is a similar view of the same parts in position for cutting, still further enlarged.

Referring to the drawings, which illustrate an adjustable reamer, the body of the tool is marked 10, and is screw threaded next its shank 11 as at 12 and next to its free end as at 13, nuts 14 and 15 being mounted on its screw threads respectively and adapted to hold the blades 17 between them. To that end the nut 14 which is toward the shank has a recessed conical face on its end which is toward the end of the tool as at 14′ and the nut 15 has a recessed conical face on its end which is toward the shank of the tool as at 15′; and the blade 17 has tapered ends. All of the blades together, which are distributed in tapered grooves 16, set at intervals around the shaft, comprise conical ends which fit within the said conical faces of the nuts 14 and 15. In consequence, either nut can be screwed so as to make all of the blades tight against the other nut and against the bottoms of their respective grooves at any place along the extent of these grooves; and as the grooves are tapering at the bottom on uniform angles, the cutting edge 17′ of each blade is parallel with the axis at different distances therefrom, according to its position along the groove. The construction thus far described is not new and constitutes one example of a tool to which the invention now to be described may be applied. In the construction of a tool embodying the invention, the groove 16 is made of such width, or the blade 17 is made of such width, that when the blade is in the groove there is room for a shim or distance piece 18 to fit in beside it. These two together fill the groove. In the form illustrated the groove has a smooth plane bottom whose cross section is perpendicular to the axis of the tool. The shim may be placed on either side of the blade in the groove. As illustrated in Figure 6 the groove is symmetrical with respect to a radius.

For purposes of grinding, the blade and shim are placed in positions shown in Fig. 5 and as indicated in dot and dash lines in Figure 6, and the nuts 14 and 15 are screwed tight so that the blades and shims are held rigidly. The outer face of the blade is then an arc of a cylinder, as shown by the dot and dash line. For use it is only necessary to transpose the blade and the shim, to the full line positions in Figure 6. This moves the blade bodily forward to a position parallel with its old position and with its cutting edge therefore parallel with the elements of the cylinder of revolution, in which it turned when the tool was operated in order to be ground. All of the blades being parallel and having been ground originally on the same cylinder and being set over equal distances by transposition with shims of equal thickness, the newly positioned cutting edges all rotate in an identical and perfect cylinder when the tool as a whole is rotated on its axis. If the tool happens to be of adjustable type, as is that illustrated, the diameter of the cutting can be adjusted at will. In either case, however, the dull tool is, by the invention, capable of being sharpened with precision as to form so that the cylinder of revolution of the cutting edges will be perfect upon the same axis as the cylinder of the grinding, but slightly larger. As the rear of the peripheral or clearance face of the blade moves into the circle on which it was ground a distance equal to that which the cutting edge moves outside of the same circle, the amount of clearance obtained is equal to double the distance to which the edge is projected beyond the grinding position in shifting it to the cutting position.

Moreover it has been discovered that blades having the convex relief produced by the invention, do smoother work and can do difficult work not possible with blades of the type hitherto known, as, for example, to ream a bushing which contains an oil groove. The grinding of the peripheral face of the blade on a convex surface of revolution produces no chamfer back of the cutting edge. In fact the stock of the blade, measured from the bottom of the groove perpendicularly outward, is really greater there than at its cutting edge. Consequently, instead of lessening the rigidity of the cutting edge, as occurs when metal back of it is cut away in chamfering, this edge is fully supported, and is backed by metal to the full thickness of the blade. The yielding of the cutting edge is so slight under these conditions and the recession of the clearance surface of the blade from the surface of the metal that is being cut is so gradual, that when the cutting pressure upon it is temporarily relieved and resumed, as by passing an oil groove or keyway, the elastic reaction of blade and of the metal body that is being cut is unappreciable. In reaming an ordinary smooth hole, it may be a similar reason that causes reamers embodying the invention to work more smoothly than those having the concave relief which is produced by the customary method of grinding, in which case there is more opportunity for the cutting edge to dig into the metal, to chatter, and even to break off in minute particles.

The distinction is herein made that the blade of the invention has and operates with a convex surface back of the cutting edge meaning by this that surface of the tool which follows immediately behind the cutting edge, and faces against the work at a slight distance therefrom, which surface is slightly eccentric with respect to its cutting path as compared with the hitherto customary concave chamfered surface made by the ordinary grinding of a non-rotating blade against a rotating wheel. Furthermore the blade of the invention, for the above reason, holds its edge longer, and requires sharpening less frequently, than the ordinary reamer of this general type.

If the blades are left in the position above described for being ground, the tool may be used for burnishing, since in that position all parts of the peripheral faces are equidistant from the axis of rotation. When thus set the peripheral faces constitute a surface of revolution concentric with the axis of the tool; but when the blades and shims are transposed to bring the blades into cutting position, each peripheral face is then a section of a surface of revolution which is eccentric with the tool axis, thereby providing an arrangement which may for convenience be called eccentric clearance or "eccentric relief" for the cutting edges.

I claim as my invention:

1. A rotatable cutting tool comprising a part having a groove, slightly inclined from the axis and a blade and spacer fitting simultaneously into the groove and transposable therein so as to vary the relation of the peripheral clearance face of said blade to the axis of rotation of the tool, whereby in one position the said face constitutes a section of a surface of revolution about said axis of rotation of the tool, and in its transposed position retreats from the path of its leading edge when rotating with the tool; said groove having a peripheral opening equal in width to the thickness of blade and spacer; and said blade being set with both edges of its peripheral face standing out beyond the walls of the groove, whereby it can be ground peripherally about the axis of the tool without the said part in which said groove is formed being thereby ground; and the blade being adjustable longitudinally on said incline to restore its operative cutting diameter notwithstanding the removal of material from it by said peripheral grinding.

2. A rotatable cutting tool having a groove in its body portion, slightly inclined from the axis, and a blade and a spacer fitting into said groove and transposable therein so as to vary the relation of the peripheral clearance face of said blade to the axis, whereby when the spacer is in forward position the said face constitutes a section of a surface of revolution about the axis of rotation of the tool, and in the transposed position said surface is eccentric to said axis; the said blade when in its first said position having both edges of its peripheral face standing out beyond the walls of its groove whereby it can be ground peripherally about the axis of the tool without thereby grinding the said body in which its groove is formed, and being adjustable longitudinally on said incline to restore its operative cutting diameter notwithstanding the removal of material from it by said peripheral grinding.

3. A rotatable cutting tool having a blade extending along the axis of rotation and set in a groove of greater width than that of the blade; combined with a spacer in said groove, adapted to be placed on either side of the blade to fill the groove transversely, thereby permitting the blade to be set firmly toward one side of the groove for sharpening, and toward the other side thereof for cutting.

4. A cutting tool having a series of blades arranged around an axis, the blades being set in grooves substantially wider than the blades and combined with spacers that are set therein and are transposable with the blades for setting each blade forward or back in the groove in the direction of revolution; the back positions being adapted for the grinding of the peripheral faces of all of the blades simultaneously on one circle about the axis; and the forward positions being for cutting, with all of the leading edges of the blades in a circle about the same axis and with their said faces curving inward therefrom.

5. A cutting tool having a series of blades arranged around an axis, the blades being set in groves substantially wider than the blades and combined with spacers transposable with the blades for setting each blade forward or back in the groove in the direction of revolution; the bottom of the grooves being such that the leading edges of blades, when the blades are back and resting on the bottom, are all in one circle about the axis of the tool, and the adjacent parts of the peripheral faces of each blade are in the same circle; and that when the blades are forward and resting on the bottom the same edges are all in another and larger circle about the same axis.

6. A cutting tool having a series of blades arranged around an axis, the blades being set in grooves substantially wider than the blades and combined with spacers that are set therein and are transposable with the blades for setting each blade forward or back in the groove in the direction of revolution; the sides and bottom of each groove being at the same angles to the radius drawn through the middle of that groove as are the corresponding sides and bottom of each other groove to its corresponding radius.

7. The art of providing clearance for blades of a rotary cutting tool comprising the positioning of the blades in grooves on the tool with their cutting edges forward and projecting out of the grooves and free from contact with the body of the tool; rotating the tool forward in cutting direction and grinding their peripheral faces circular to the axis of the tool while so positioned; then shifting the blades, each in its respective groove, from their said positions to cutting positions further forward wherein the peripheral face of each blade retreats inward from that surface of revolution which its cutting edge generates, in its cutting position, when the tool is rotated on its same said axis.

8. The art of grinding and re-grinding blades of a rotary tool for precision cutting, comprising the rotation of the tool during grinding and re-grinding with its blades fixed in grooves, each blade being at that time set at a space backward from the leading edge of its respective groove, with its cutting edge facing forward in the direction of cutting; followed by the shifting of each blade further forward in the same groove while facing in the same direction to a position against said leading edge of its groove, and moving it therein to a greater distance from the axis of the tool, according to the amount of grinding, to its position for precision cutting; the said blade, when in each said position, having its cutting edge projecting out of its said groove, radially beyond contact with the body of the tool.

9. A reamer or the like having a groove whose sides are paralled planes and a blade whose sides are parallel planes, said blade being movable transversely of the groove from one to the other of said sides, to position it respectively for cutting and for being ground, and means to hold the blade against each side of the groove, whereby the tool is adapted to be rotated both for cutting and for being sharpened.

10. A rotary cutting tool having a groove whose bottom is perpendicular to the radius drawn through the middle of the groove, and a blade which is movable across said bottom to different positions on the tool for cutting and for being ground; said tool being adapted, by the movability of its blade, to be rotated both for cutting and for being sharpened.

11. A rotary cutting tool having a blade whose relief surface is the convex side of an arc; said blade being movable parallel to itself on the tool and transversely with respect to a radius drawn through the blades, so that the tool and blade can be rotated both for cutting and for being sharpened; the said convex surface when set for being sharpened being a part of a surface of revolution about the axis on which the tool rotates when cutting.

12. A cutting tool adapted to be rotated for cutting and for being sharpened, having a groove whose sides are perpendicular to its bottom into which a blade and a spacer fit together; the blade and the spacer being transposable in the groove to set the blade against one side for cutting and against the other side for being sharpened.

13. A cutting tool adapted to be rotated for cutting and for being sharpened, having a groove, and a blade and a spacer which fit therein together and substantially fill the groove transversely with the blade protruding; the blade and the spacer being transposable transversely in the groove, to set the blade in one protruding position for cutting and in another protruding position for being sharpened.

14. A reamer or the like having a groove whose sides are plane surfaces, a blade and a spacer together substantially filling the groove having surfaces adapted to rest against the sides of the groove and against each other; said blade and spacer being transposable in the groove to set the blade in one position for cutting and in another position for being ground, whereby the tool is rotatable both for cutting and for being sharpened.

15. A cutting tool adapted to be rotated for cutting and for being sharpened, comprising a body having a longitudinal groove; a blade and a spacer adapted to pass through the peripheral opening of the groove, for insertion and removal, and to be transposed with respect to each other in the groove, to set the blade with flat support against one wall of the groove, but in different positions with respect thereto, being positioned against one wall of the groove for cutting and against another wall thereof for being sharpened; and means for holding the blade in the groove in each said setting.

16. A rotary cutting tool, adapted to be rotated for cutting and for being sharpened, comprising a body having a longitudinal groove; a blade and a spacer adapted together to fit easily and substantially to fill all space between its walls, and to pass through the peripheral opening of the groove for insertion and removal, in order that the blade may be set in one position in the groove for cutting and in another position in the same groove for being sharpened; and means additional to said spacer and groove walls for holding the blade in the groove in each said position.

17. A cutting tool adapted to be rotated for cutting and for being sharpened, comprising a body having a longitudinal groove; a blade and spacer adapted together to occupy the groove, whose combined width does not exceed the width of the peripheral opening of the groove, thereby permitting the blade and spacer to be inserted and removed through said opening; the said blade being transposable with the spacer, transversely of the groove, to set the blade in one position for being sharpened and in another position for cutting; and means for holding the blade in the groove in each said position.

18. A cutting tool adapted to be rotated for cutting and for being sharpened, having a longitudinal groove whose peripheral opening is everywhere as wide as is the portion of the groove between such opening and the axis; a blade and a spacer adapted to fit within and to fill the groove, being insertible and removable through said opening, and adapted to occupy positions transposed transversely in the groove, to set the blade in one position for being sharpened and in another position for cutting; and means for holding the blade in the groove in each said position.

19. A cutting tool adapted to be rotated for cutting and for being sharpened comprising a body having a longitudinal groove; a blade having its transverse dimension less than the peripheral opening of said groove, and means to hold it therein; means for setting said blade therein against one wall of said groove for cutting, and against another wall of the same groove for being sharpened; said blade and said means being adapted to pass through the peripheral opening of said groove while the blade is thus set against either of its said walls; and means other than the said setting means and groove walls for holding said blade in the groove.

Signed at Boston, Massachusetts, this twenty-eighth day of October, 1921.

VICTOR H. PETERSON.